3,299,150
HYDRATION OF OLEFINS TO ALCOHOLS AND ETHERS USING HALOGENATED ALKANOL SOLVENTS
Robert B. Mosely and Michael N. Papadopoulos, Walnut Creek, Calif., assignors to Shell Oil Company, New York, N.Y., a corporation of Delaware
No Drawing. Filed July 31, 1963, Ser. No. 299,117
7 Claims. (Cl. 260—614)

This invention relates to a process for hydrating olefins, and relates more particularly to the production of alcohols and ethers from olefins containing at least two carbon atoms.

The hydration of olefins to produce alcohols and ethers is well known. However, when a hydrocarbon mixture containing paraffinic diluents (such as a hydrocarbon mixture obtained from the cracking of hydrocarbon oils) is hydrated in the presence of a catalyst such as sulfuric acid, the resulting conversion of the olefin is generally low. Product distribution in the hydration reaction is largely a function of temperature and acid strength. In general, ethers are preferentially produced at higher temperatures (e.g., over 100° C.) and slightly higher acid strengths. The present invention is suitably applicable for either alcohol or ether production over a range of conditions.

In accordance with the present invention, the conversion in olefin hydration is markedly increased by the use of halogenated aliphatic alcohol in the hydration process. Additional advantages of this process will be apparent from the following detailed description of the invention. For convenience, the invention is generally described in terms of hydration under conditions conducive to the production of alcohols, but is not so limited.

The invention is broadly applicable to the hydration of hydrocarbon mixtures containing olefin and paraffin each having at least 2 carbon atoms. It is particularly applicable to hydrocarbon mixtures containing olefin and paraffin each having from 2 to about 7 carbon atoms obtained from the cracking of hydrocarbon oils. It is preferably used when processing hydrocarbon mixtures containing iso-olefins and paraffins having from 5 to 7 carbon atoms.

The hydration of olefin to alcohol proceeds according to the formula:

$$C_nH_{2n} + H_2O \xrightarrow{\text{catalyst}} C_nH_{2n+1}OH$$

The equilibrium expression for the above reaction can be written as:

$$K = \frac{{}^aC_nH_{2n+1}OH}{({}^aH_2O)({}^aC_nH_{2n})} \quad (1)$$

wherein K represents the equilibrium constant and $a$ represents the activity of the indicated component. If concentrations are used instead of activities in the above formula, it has been found that the equilibrium constant varies markedly with initial olefin concentration. For example, the effect of initial olefin concentration (in the hydrocarbon phase) on conversion at equilibrium is shown using a hydrocarbon mixture consisting of n-pentane and 2-methyl-1-pentene. The hydrocarbon mixture was contacted with sulfuric acid of about 52% w. concentration at about 5° C., for about 2 hours reaction time and at an acid-to-hydrocarbon phase ratio of about 1:1. The results of these tests are given in Table I.

TABLE I.—EFFECT OF INITIAL OLEFIN CONCENTRATION ON CONVERSION

| Feed Composition, Percent v. | | Product Composition, Percent w.[1] | | Apparent Equilibrium Constant [2] |
|---|---|---|---|---|
| 2-methyl-1-pentene | n-Pentane | 2-methyl-pentanol | 2-methyl-1-pentene | |
| 30 | 70 | 19 | 81 | 0.77 |
| 35 | 65 | 27 | 73 | 1.2 |
| 50 | 50 | 51 | 49 | 3.4 |
| 100 | 0 | 86 | 14 | 20.0 |

[1] n-Pentane—free basis.
[2] Calculated using 0.31 for activity of water per S. Shankland ands A. R. Gordon, 61 J. Am. Chem. Soc. 2370 (1939), and concentration for activities of 2-methyl-2-pentanol and 2-methyl-1-pentene.

As the activity of the water is essentially constant in the above hydration reactions because the water concentration remains virtually unchanged, the equilibrium expression can therefore be written:

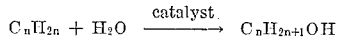

$$K^1 = \frac{{}^aC_nH_{2n+1}OH}{{}^aC_nH_{2n}} = \frac{{}^BC_nH_{2n+1}OH}{{}^BC_nH_{2n}} \times \frac{{}^\gamma C_nH_{2n+1}OH}{{}^\gamma C_nH_{2n}} \quad (2)$$

wherein B and $\gamma$ represent concentration and activity coefficient respectively.

Since the *actual* equilibrium constant does not change, the wide variation in the apparent equilibrium constant (calculated with activity coefficients of unity; i.e., as ideal solutions) indicates a large change in the activity coefficients with concentration of reactant and product in the reaction mixture. At low concentrations, the alcohol forms of very non-ideal solution with the hydrocarbon phase (high activity coefficient, low solubility) and the conversion of olefin to alcohol is correspondingly low.

We have found that the addition of halogenated aliphatic alcohol to the reaction mixture greatly increases the conversion of olefin obtained. The halogenated alcohol forms a separate phase containing the product, thereby displacing equilibrium toward alcohol formation. The halogenated alcohol is substantially immiscible with the aqueous acid, and is slightly soluble in the hydrocarbon phase. This solubility of halogenated alcohol in the hydrocarbon phase, although slight, apparently has a very beneficial effect of increasing the solubility (i.e., lowering the activity coefficient) of the hydration product in the hydrocarbon phase. Moreover, as the halogenated alcohol is slightly acidic, it probably forms a weak complex with the alcohol. The formation of the weak complex further aids the conversion of olefin to alcohol. The complex can be easily broken during the separation of the alcohol from the halogenated alcohol by any suitable means such as by stripping or flashing the alcohol from the halogenated alcohol.

While the use of the halogenated alcohol is applicable to my aqueous hydration catalyst system such as a hydrofluoric acid system or a phosphoric acid system, it is preferred to carry out the hydration reaction in an aqueous sulfuric acid system wherein the concentration of the sulfuric acid is from about 40% to about 95% w., preferably from about 50% to about 70% w. for alcohol formation and from about 65% to about 90% w. for ether formation. When hydrating a hydrocarbon mixture containing olefin and paraffin having 3 or more carbon atoms the hydration can be carried out at a temperature in the range of from about 0° C. to about 150° C., preferably from about 10° C. to about 70° C. for alcohol production, and from about 100° C. to about 140° C. for ether production. For alcohol formation, a temperature in the range of from about 50° C. to about 70° C. is preferred for the hydration of $C_3$ olefins; a temperature in the range of from about 20° C. to about 70° C. is particularly suitable for the hydration of $C_3$ and $C_4$ olefin; and a temperature in the range of from about 0° C. to about 30° C., preferably from about 0° C. to about 20° C., is particularly conducive to the selective hydration of iso-olefin to tertiary alcohol. The volumetric ratio of acid to hydrocarbon is from about 1:3 to about 3:1, preferably about 1:1, for any of the reactions within the scope of this invention.

The halogenated aliphatic alcohol used in the invention is preferably one or more of the more stable fluorinated and/or chlorinated alcohols. The preferred halogenated alcohol can be conveniently represented by the formula:

$$Y(CX_2)_nZOH$$

wherein X is a halogen having an atomic weight of less than 40, e.g., chlorine and fluorine, y is hydrogen or a halogen having an atomic weight of less than 40, Z is a hydrocarbon radical selected from —CH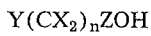—CH$_2$CH$_2$— and

and $n$ is a positive integer from 1 to 6, preferably from 4 to 6. The X's can also be the same or different within the same halogenated alcohol compound. When mixtures of the halogenated alcohols are used and one of the halogenated alcohols has a low molecular weight, $n$ can be a positive integer from 1 to 8.

Examples of suitable alcohols are 2,2-difluoro-1-ethanol, 2,2,2-trifluoroethanol, 2,2,3,3-tetrafluoro-1-propanol, 2,2,3,3-tetrachloro-1-propanol, 2-chloro-2,3,3-trifluoro-1-propanol, 3,3,4,4-tetrafluoro-1-butanol, 3,3,4,4-tetrafluoro-2-butanol, 2,2,3,3,4,4-hexafluoro-1-butanol, 2,2,3,3,4,4,4-heptachloro-1-butanol, 2,2,3,3,4,4,5,5-octafluoro-1-pentanol, 2,2,3,3,4,4,5,5-octachloro-1-pentanol, 2,2,3,3,4,4,5,5,6,6,7,7-dodecafluoro-1-heptanol, 2,2,3,3,4,4,5,5,6,6,7,7-dodecachloro-1-heptanol and 2,2,3,3,4,4,5,5,6,6,7,7,8,8,9,9-hexadecafluoro-1-nonanol.

The halogenated alcohols can be prepared by any suitable means. For example, a series of the halogenated alcohols containing an odd number of carbon atoms can be prepared by telomerization of methanol and tetrahaloethylene. The $C_7$ and heavier halogenated alcohols prepared by telomerization can contain small amounts of corresponding secondary alcohols and of homologous alcohols. For example, a $C_7$ fluorinated alcohol suitable for use in the invention might have the following analyses: primary alcohol 92%, secondary alcohol 6% and homologous alcohols 2%.

The halogenated alcohol is introduced into the hydration reactor in any suitable manner, e.g., with the hydrocarbon feed. The volumetric ratio of halogenated alcohol to aqueous phase, in the hydration zone, is from about 5:1 to about 1:5, preferably from about 2:1 to about 1:3. As stated before, the hydration product can be separated from the halogenated alcohol by any suitable means such as fractionation including flashing or stripping. The recovered halogenated alcohol is returned to the hydration process.

The following examples are illustrative of some of the advantages derived from the invention, but are not to be considered to limit the scope of the invention.

*Example I*

A hydrocarbon mixture consisting of 30% v. 2-methyl-1-pentene and n-pentane was contacted with 200 cc. of sulfuric acid of about 52% w. concentration at about 5° C. for about 2 hours reaction time and at an acid to hydrocarbon ratio of about 1:1. The results are given in Table II.

TABLE II.—HYDRATION OF OLEFIN USING SULFURIC ACID

Product composition, percent w.:
  n-Pentane _____ 67.6
  2-methyl-1-pentene _____ 16.1
  2-methyl-2-pentene _____ 10.9
  2-methyl-2-pentanol _____ 5.4

Product composition, pentane free, percent w.:
  2-methyl-1-pentene _____ 49.6
  2-methyl-2-pentene _____ 33.6
  2-methyl-2-pentanol _____ 16.8

*Example II*

A hydrocarbon mixture, having the same composition as that used in Example I, was contacted with 150 cc. of sulfuric acid of about 52% w. concentration and 50 cc. of 2,2,3,3,4,4,5,5-octafluoro-1-pentanol. The reaction time was about 2 hours and the reaction temperature was about 5° C. Table III shows the effect of replacing 25% of the acid catalyst with halogenated alcohol.

TABLE III.—EFFECT OF HALOGENATED ALCOHOL ON CONVERSION OF OLEFIN TO ALCOHOL

Product composition, percent w.:
  n-Pentane _____ 63.8
  2-methyl-1-pentene _____ 10.9
  2-methyl-2-pentene _____ 4.0
  2-methyl-1-pentanol _____ 21.3

Product composition, pentane free, percent w.:
  2-methyl-1-pentene _____ 30.1
  2-methyl-2-pentene _____ 11.0
  2-methyl-1-pentanol _____ 58.8

Conversion was increased more than threefold when the halogenated alcohol was used in the hydration process.

*Example III*

A $C_6$ fraction obtained from catalytically cracking a heavy hydrocarbon oil was contacted with 200 cc. of sulfuric acid of about 52% w. concentration at about 5° C., for about one hour reaction time and at an acid to hydrocarbon ratio of about 1:1. The alcohol content of the product was about 10% w. (inert free basis).

*Example IV*

Another portion of the $C_6$ fraction used in Example III was contacted with 100 cc. of sulfuric acid of about 52% concentration and 100 cc. of 2,2,3,3,4,4,5,5-octafluoro-1-pentanol. The reaction time was about 1 hour and the reaction temperature was about 5° C. The alcohol content of the product was about 33% w. (inert free basis). Thus, more than a threefold increase in conversion was realized when halogenated alcohol was used in the hydration process.

Additional examples of specific embodiments of the invention are contemplated as follows:

*Example V*

A $C_3$ fraction containing propylene and propane is contacted with about an equal volume of aqueous sulfuric acid of about 65% w. at about 60° C. for about 20 minutes. At the end of this time the propylene is about 90% converted to isopropyl alcohol, substantially all of which is in the acid phase. The isopropyl alcohol is recovered by steam stripping (wherein a lead-lined reboiler is required) during which recovery of about 10% of the isopropyl alcohol reverts to propylene. The overall yield of isopropyl alcohol is about 80%.

*Example VI*

Another portion of the $C_3$ fraction of Example V is contacted with about an equal volume of a 1:1 volumetric mixture of about 65% w. $H_2SO_4$ and 2,2,3,3,4,4,5,5,6,6,7,7- dodecafluoro-1-heptanol under substantially the same conditions as in Example V except that five contacting stages are employed. 90% of the 2-propanol is found to be in the fluorinated alcohol phase from which it may be recovered by flashing, steam stripping or the like. The acid phase is recycled without the necessity for steam stripping and/or acid reconcentration.

*Example VII*

A portion of the $C_3$ fraction of Example V is contacted with about an equal volume of a 1:1 volumetric mixture of about 80% w. $H_2SO_4$ and the fluoroalcohol of Example VI at a temperature of 120° C. Most of the diisopropyl ether product is found in the fluoroalcohol phase, from which it may be recovered by flashing, steam stripping, etc.

We claim as our invention:

1. A process for the conversion of olefin to alcohol and ether which comprises:
    (a) passing substantially in the liquid phase a hydrocarbon mixture containing paraffin and olefin, each having from 2 to about 7 carbon atoms per molecule into a hydration zone containing an aqueous hydration catalyst selected from the group consisting of phosphoric, hydrofluoric and sulfuric acids, and halogenated alcohol having the formula:

$$Y(CX_2)_nZOH$$

wherein X is selected from the group consisting of chlorine and fluorine, Y is selected from the group consisting of hydrogen, chlorine and fluorine, Z is a hydrocarbon radical selected from the group consisting of —$CH_2$—, —$CH_2CH_2$—, and $$-\overset{|}{C}HCH_3$$

and $n$ is a positive integer from 1 to 6, the halogenated alcohol being present in an amount such that the volumetric ratio of halogenated alcohol to aqueous phase is from about 5:1 to 1:5;
    (b) hydrating said olefin at a temperature of from about 0° C. to about 150° C.; and
    (c) recovering the resulting hydration product selected from the group consisting of alcohol and ether from the hydration zone effluent.

2. The process according to claim 1 wherein the aqueous hydration catalyst comprises sulfuric acid having a concentration of from about 40% w. to about 95% w.

3. A process for the conversion of olefin to alcohol which comprises:
    (a) passing substantially in the liquid phase a hydrocarbon mixture containing paraffin and olefin, each having from 2 to 4 carbon atoms per molecule into a hydration zone containing aqueous sulfuric acid having a concentration of from about 50% w. to about 70% w., and fluorinated alcohol having the formula:

$$H(CF)_nCH_2OH$$

wherein $n$ is a positive integer from 4 to 6, the fluorinated alcohol being present in an amount such that the volumetric ratio of fluorinated alcohol to aqueous phase is from about 2:1 to about 1:3;
    (b) hydrating said olefin at a temperature of from about 20° C. to about 70° C.; and
    (c) recovering the resulting alcohol from the hydration zone effluent.

4. A process for the conversion of iso-olefin to tertiary alcohol which comprises:
    (a) passing substantially in the liquid phase a hydrocarbon mixture containing paraffin and iso-olefin, each having from 5 to 7 carbon atoms per molecule into a hydration zone containing aqueous sulfuric acid having a concentration of from about 40% w. to about 80% w., and halogenated alcohol having the formula:

$$Y(CX_2)_nZOH$$

wherein X is selected from a group consisting of chlorine and fluorine, Y is selected from the group consisting of hydrogen, chlorine and fluorine, Z is a hydrocarbon radical selected from the group consisting of —$CH_2$—, —$CH_2CH_2$—, and $$-\underset{CH_3}{\overset{|}{C}H}-$$

and $n$ is a positive integer from 1 to 6, the halogenated alcohol being present in an amount such that the volumetric ratio of halogenated alcohol to aqueous phase is from about 5:1 to 1:5;
    (b) hydrating said iso-olefin at a temperature of from about 0° C. to about 30° C.; and
    (c) recovering the resulting tertiary alcohol from the hydration zone effluent.

5. A process for the conversion of iso-olefin to tertiary alcohol which comprises:
    (a) passing substantially in the liquid phase a hydrocarbon mixture containing paraffin and iso-olefin, each having from 5 to 6 carbon atoms per molecule into a hydration zone containing aqueous sulfuric acid having a concentration of from about 50% w. to about 70% w., and fluorinated alcohol having the formula:

$$H(CF)_nCH_2OH$$

wherein $n$ is a positive integer from 4 to 6, the fluorinated alcohol being present in an amount such that the volumetric ratio of fluorinated alcohol to aqueous phase is from about 2:1 to about 1:3;
    (b) hydrating said iso-olefin at a temperature of from about 0° C. to about 20° C.; and
    (c) recovering the resulting tertiary alcohol from the hydration zone effluent.

6. A process according to claim 5 wherein the paraffin and iso-olefin each have 6 carbon atoms per molecule.

7. A process for the conversion of olefin to ether which comprises:
    (a) passing substantially in the liquid phase a hydrocarbon mixture containing propane and propylene into a reaction zone containing aqueous sulfuric acid having a concentration of from about 50 to about 95% w., and fluorinated alcohol having the formula:

$$Y(CX_2)_nZOH$$

wherein X is selected from a group consisting of chlorine and fluorine, Y is selected from the group consisting of hydrogen, chlorine and fluorine, Z is a hydrocarbon radical selected from the group consisting of —$CH_2$—, —$CH_2CH_2$—, and $$-\underset{CH_3}{\overset{|}{C}H}-$$

and $n$ is a positive integer from 1 to 6, the fluorinated alcohol being present in an amount such that the volumetric ratio of fluorinated alcohol to aqueous phase is from 5:1 to 1:5;
    (b) hydrating said propylene at a temperature of from about 100° C. to about 140° C.; and
    (c) recovering the resulting diisopropyl ether from the hydration zone effluent.

References Cited by the Examiner

UNITED STATES PATENTS

| | | | |
|---|---|---|---|
| 2,042,222 | 5/1936 | Groil et al. | 260—633 |
| 2,118,882 | 5/1938 | Francis | 260—641 |
| 2,178,186 | 12/1939 | Oldershaw | 260—614 |
| 2,373,942 | 4/1945 | Bergsteinsson. | |

LEON ZITVER, *Primary Examiner.*

J. E. EVANS, *Assistant Examiner.*